(12) United States Patent
Marinero

(10) Patent No.: US 8,119,264 B2
(45) Date of Patent: Feb. 21, 2012

(54) PERPENDICULAR MAGNETIC RECORDING DISK WITH ULTRATHIN NUCLEATION FILM FOR IMPROVED CORROSION RESISTANCE AND METHOD FOR MAKING THE DISK

(75) Inventor: Ernesto E. Marinero, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 77 days.

(21) Appl. No.: 12/730,927

(22) Filed: Mar. 24, 2010

(65) Prior Publication Data

US 2010/0178529 A1 Jul. 15, 2010

Related U.S. Application Data

(62) Division of application No. 11/314,128, filed on Dec. 21, 2005, now Pat. No. 7,713,389.

(51) Int. Cl.
*G11B 5/66* (2006.01)

(52) U.S. Cl. ............. 428/831.2; 428/828.1; 428/829; 428/836.2

(58) Field of Classification Search ........................ None
See application file for complete search history.

(56) References Cited

U.S. PATENT DOCUMENTS

| | | | |
|---|---|---|---|
| 6,045,931 A | 4/2000 | Song et al. | |
| 6,183,832 B1 | 2/2001 | Margulies et al. | |
| 6,686,070 B1 | 2/2004 | Futamoto et al. | |
| 6,767,651 B2 | 7/2004 | Uwazumi et al. | |
| 6,777,066 B1 | 8/2004 | Chang et al. | |
| 6,835,475 B2 | 12/2004 | Carey et al. | |
| 7,033,686 B2* | 4/2006 | Hirayama et al. | 428/832 |
| 2002/0028357 A1* | 3/2002 | Shukh et al. | 428/694 TM |
| 2002/0160232 A1* | 10/2002 | Shimizu et al. | 428/694 TM |
| 2003/0170500 A1* | 9/2003 | Shimizu et al. | 428/694 TM |
| 2004/0023073 A1 | 2/2004 | Shimizu et al. | 428/694 MM |
| 2004/0191571 A1 | 9/2004 | Hirayama et al. | |
| 2004/0247945 A1 | 12/2004 | Chen et al. | 428/694 TS |
| 2005/0058854 A1* | 3/2005 | Takekuma et al. | 428/694 TM |
| 2005/0058855 A1 | 3/2005 | Girt | |
| 2005/0142388 A1 | 6/2005 | Hirayama et al. | |
| 2006/0040118 A1 | 2/2006 | Yasui et al. | |
| 2006/0057431 A1* | 3/2006 | Tamai et al. | 428/836.2 |
| 2006/0088737 A1 | 4/2006 | Hirayama et al. | 428/836.2 |

FOREIGN PATENT DOCUMENTS

| | | |
|---|---|---|
| JP | 2004342205 | 12/2004 |
| WO | 2004064048 A2 | 7/2004 |
| WO | WO 2004/064048 A2 | 7/2004 |

\* cited by examiner

*Primary Examiner* — Kevin Bernatz
(74) *Attorney, Agent, or Firm* — Thomas R. Berthold

(57) ABSTRACT

A perpendicular magnetic recording disk has a granular cobalt alloy recording layer (RL) containing an additive oxide or oxides, an intermediate layer (IL) as an exchange-break layer on the "soft" magnetic underlayer (SUL), and an ultrathin nucleation film (NF) between the IL and the RL. In the method of making the disk, the IL is deposited at a relatively low sputtering pressure, to thereby reduce the roughness of the RL and overcoat (OC), while the NF and RL are deposited at substantially higher sputtering pressures. The resulting disk has good recording properties and improved corrosion resistance over a comparable disk made with an IL deposited at high sputtering pressure and without the NF. The NF may be a discontinuous film with an average thickness of less than about 1 nm.

11 Claims, 5 Drawing Sheets

PERPENDICULAR MAGNETIC RECORDING DISK WITH ULTRATHIN NUCLEATION FILM FOR IMPROVED CORROSION RESISTANCE AND METHOD FOR MAKING THE DISK

RELATED APPLICATION

This application is a divisional of application Ser. No. 11/314,128 filed Dec. 21, 2005.

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. A common type of perpendicular magnetic recording system is one that uses a "dual-layer" media. This type of system is shown in FIG. 1 with a single write pole type of recording head. The dual-layer media includes a perpendicular magnetic data recording layer (RL) formed on a "soft" or relatively low-coercivity magnetically permeable underlayer (SUL). The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field $H_w$ acting on the recording layer RL. The disk also includes the hard disk substrate, a seed or onset layer (OL) for growth of the SUL, an intermediate layer (IL) between the SUL and the RL, and a protective overcoat (OC). The IL is a nonmagnetic layer or multilayer structure, also called an "exchange break layer" or EBL, that breaks the magnetic exchange coupling between the magnetically permeable films of the SUL and the RL and facilitates epitaxial growth of the RL. While not shown in FIG. 2, a seed layer is typically deposited directly on the SUL to facilitate the growth of the IL. As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the IL and by virtue of its high permeability produces a magnetic mirror image of the RWH during the write process. This effectively brings the RL into the gap of the ARH and allows for a large write field $H_w$, inside the RL.

One type of material for the RL is a granular ferromagnetic cobalt alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce intergranular exchange coupling, which is responsible for high intrinsic media noise. Enhancement of grain segregation in the cobalt alloy RL is achieved by the addition of oxides, including oxides of Si, Ta, Ti, and Nb. These oxides tend to precipitate to the grain boundaries, and together with the elements of the cobalt alloy form nonmagnetic intergranular material. A perpendicular magnetic recording medium with a RL of a CoPtCr granular alloy with added $SiO_2$ is described by H. Uwazumi, et al., "CoPtCr—$SiO_2$ Granular Media for High-Density Perpendicular Recording", *IEEE Transactions on Magnetics*, Vol. 39, No. 4, July 2003, pp. 1914-1918. A perpendicular magnetic recording medium with a RL of a CoPt granular alloy with added $Ta_2O_5$ is described by T. Chiba et al., "Structure and magnetic properties of Co—Pt—$Ta_2O_5$ film for perpendicular magnetic recording media", *Journal of Magnetism and Magnetic Materials*, Vol. 287, February 2005, pp. 167-171.

The cobalt alloy RL has substantially out-of-plane or perpendicular magnetic anisotropy as a result of the c-axis of its hcp crystalline structure being induced to grow substantially perpendicular to the plane of the layer during deposition. To induce this growth of the hcp RL, the IL onto which the RL is formed is also an hcp material. Ruthenium (Ru) and certain Ru alloys, such as RuCr, are nonmagnetic hcp materials that are used for the IL.

The enhancement of segregation of the magnetic grains in the RL by the additive oxides is important for achieving high areal density and recording performance. The intergranular material not only effectively decouples intergranular exchange but also exerts control on the size and distribution of the magnetic grains in the RL. Current disk fabrication methods achieve this segregated RL by growing the RL on an IL that exhibits columnar growth of its grains. The columnar growth of the IL is accomplished by sputter depositing it at a relatively high sputtering pressure. However, growth of the RL on this type of IL leads to significant roughness and discontinuities in the RL, and consequently to reduced mechanical integrity of the protective OC. Poor OC coverage, roughness in the RL, and columnar growth of the IL provide a relatively easy path for water and corrosive agents to migrate through these layers and interact with the SUL. Formation of the IL at reduced sputtering pressure can reduce the RL roughness and improve the corrosion resistance of the disk. However, disks with ILs formed at lower sputtering pressure exhibit significantly reduced coercivity and thus poor recording performance.

What is needed is a perpendicular magnetic recording disk that has a granular cobalt alloy RL with additive oxides and that exhibits good corrosion resistance without compromising recording performance.

SUMMARY OF THE INVENTION

The invention is a perpendicular magnetic recording disk with a granular cobalt alloy recording layer (RL) containing an additive oxide or oxides, an intermediate layer (IL) as an exchange-break layer on the SUL, and an ultrathin nucleation film (NF) between the IL and the RL. In the method of making the disk, the IL is deposited at substantially lower sputtering pressure than in the prior art, to thereby reduce the roughness of the RL and overcoat (OC), while the NF and RL are deposited at substantially higher sputtering pressures. The resulting disk has good recording properties and improved corrosion resistance over a comparable disk made with an IL deposited at high sputtering pressure and without the NF.

The NF is ultrathin, less than about 1.5 nm, and preferably less than about 1.0 nm. In this thickness regime, the thickness is an "average" thickness of a discontinuous film, so that the surface onto which the RL is deposited includes both the IL material and clusters or regions of the NF material. In one embodiment the NF is an oxide of Ta, Ti, Nb, Si, Mn or Hf The NF may also include Co or a Co alloy in addition to the oxide.

For a fuller understanding of the nature and advantages of the present invention, reference should be made to the following detailed description taken together with the accompanying figures.

DETAILED DESCRIPTION OF THE INVENTION

Figure 1:
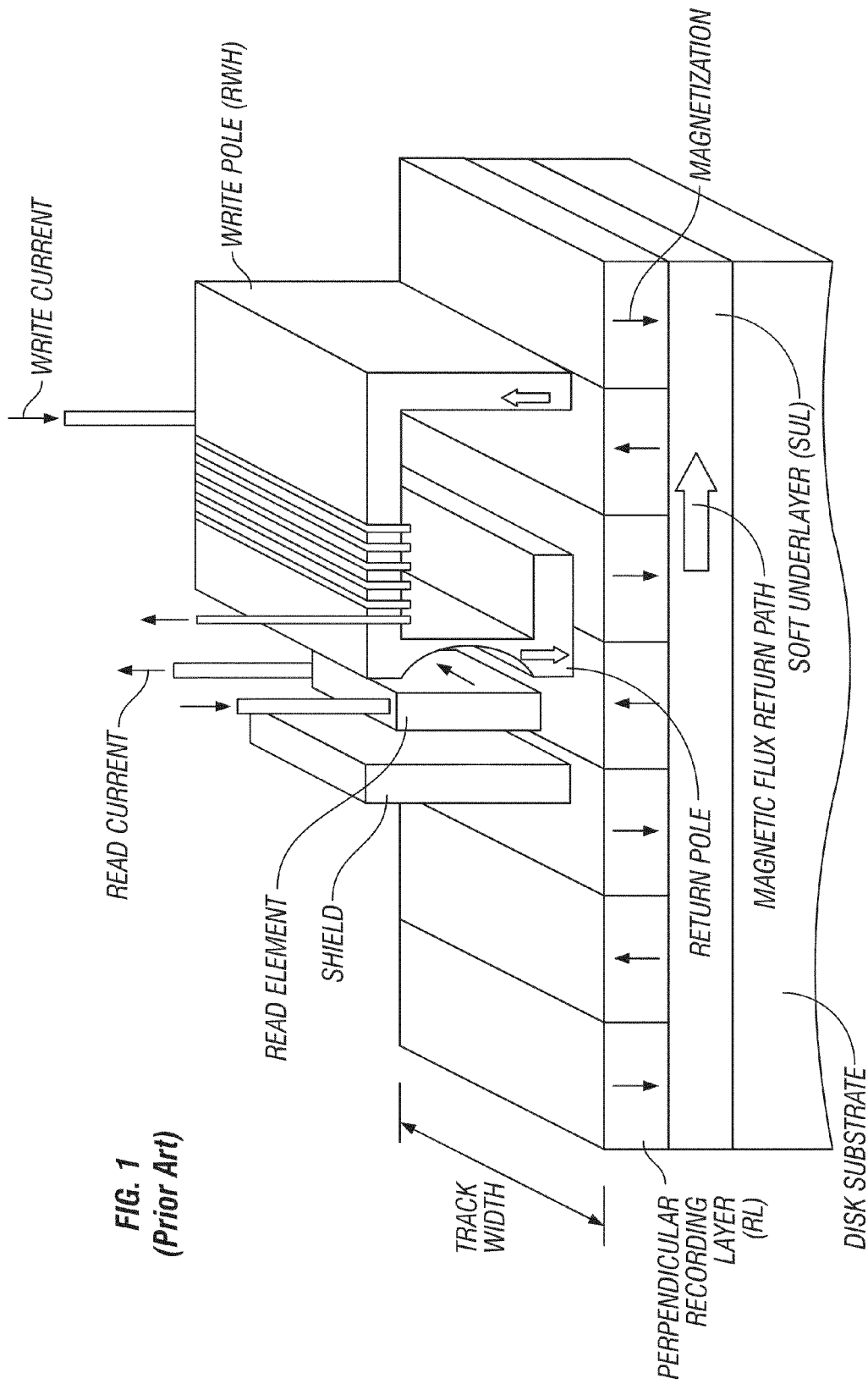
FIG. 1 is a schematic of a prior art perpendicular magnetic recording system.
Figure 2:
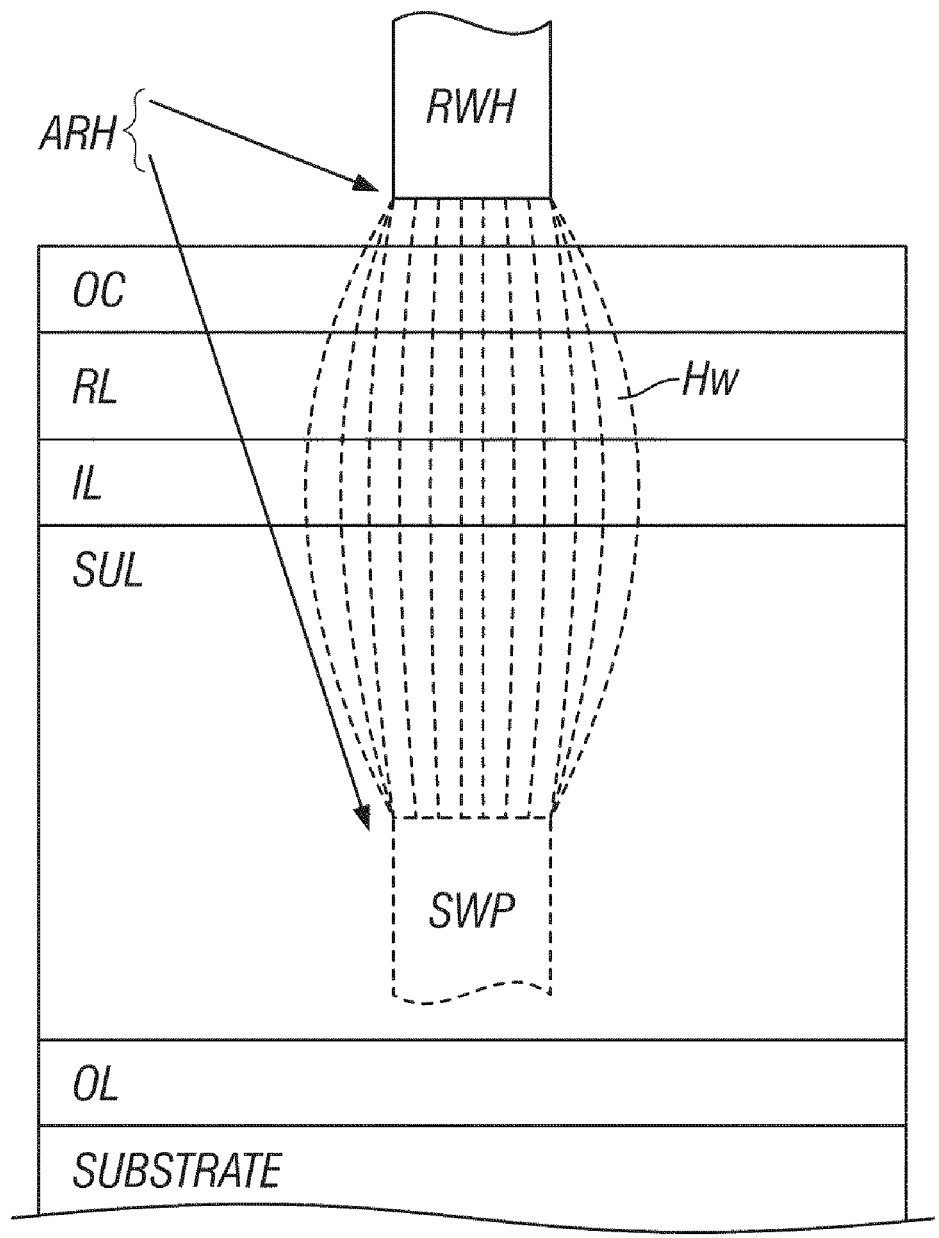
FIG. 2 is a schematic of a cross-section of a perpendicular magnetic recording disk according to the prior art and depicting the write field.
Figure 3:
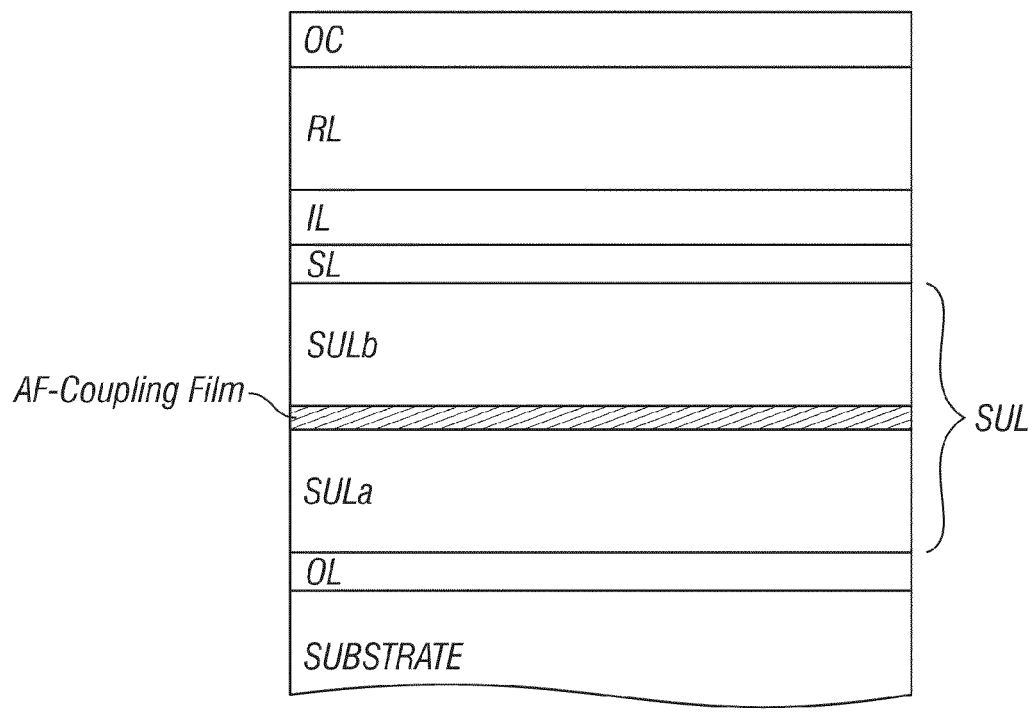
FIG. 3 is a schematic of a cross-section of a perpendicular magnetic recording disk according to the prior art and illustrating an antiferromagnetically-coupled SUL.

FIG. 3 is a schematic of a cross-section of a perpendicular magnetic recording disk according to the prior art and illustrating an antiferromagnetically-coupled SUL. The various layers making up the disk are located on the hard disk substrate. The substrate may be any commercially available glass substrate, but may also be a conventional aluminum alloy with a NiP or other known surface coating, or an alternative substrate, such as silicon, canasite or silicon-carbide. The SUL is located on the substrate, either directly on the substrate or directly on an adhesion layer or OL. The OL facilitates the growth of the SUL and may be an AlTi alloy or a similar material with a thickness of about 2-5 nanometers (nm). In the disk of FIG. 3, the SUL is a laminated or multilayered SUL formed of multiple soft magnetic layers (SULa and SULb) separated by an interlayer film (such as Ru, Ir, or Cr) that acts as an antiferromagnetic (AF) coupling film to mediate antiferromagnetic exchange coupling between SULa and SULb. This type of SUL is described in U.S. Pat. Nos. 6,686,070 B1 and 6,835,475 B2. However, instead of the AF-coupled SUL, the SUL may be a single-layer SUL or a non-AF-coupled laminated or multilayered SUL that is formed of multiple soft magnetic films separated by nonmagnetic films, such as films of carbon or SiN or electrically conductive films of Al or CoCr. The SUL layer or layers are formed of amorphous magnetically permeable materials such as alloys of CoNiFe, FeCoB, CoCuFe, NiFe, FeAlSi, FeTaN, FeN, FeTaC, CoTaZr, CoFeB, and CoZrNb. The thickness of the SUL is typically in the range of approximately 50-400 nm. The OC formed on the RL may be an amorphous "diamond-like" carbon film or other known protective overcoat, such as silicon nitride (SiN).

The nonmagnetic IL on the SUL is a nonmagnetic metal or alloy having a hexagonal close-packed (hcp) crystal structure for controlling the hcp crystal orientation in the granular RL. The IL promotes the growth of the hcp granular RL so that its c-axis is oriented substantially perpendicular, thereby resulting in perpendicular magnetic anisotropy. Ruthenium (Ru) is a commonly used material for the IL, but other materials include a metal selected from Ti, Re, and Os, and an alloy containing at least one element selected from Ti, Re, Ru, and Os, including Ru-based alloys such as a RuCr alloy. The IL may be formed on a seed layer (SL) formed on the SUL.

The RL is a granular ferromagnetic Co alloy with intergranular material that includes an oxide or oxides. The oxides are typically oxides of one or more of Si, Ta, Ti and Nb. The RL may also contain Cr, with one or more oxides of Cr also being present as intergranular material.

Figure 4:
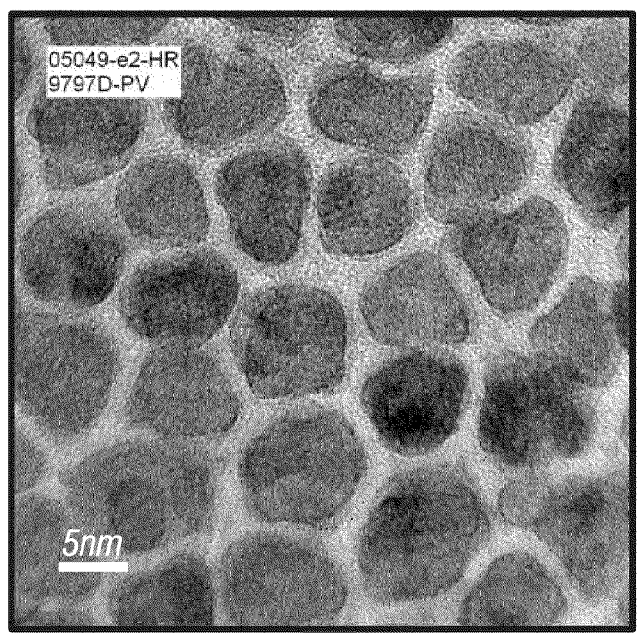
FIG. 4 is a transmission electron microscopy (TEM) image of a portion of a disk with a CoPtCr—SiO$_2$ RL formed on an IL of a bilayer of Ru.

FIG. 4 is a transmission electron microscopy (TEM) image of a portion of a disk with a CoPtCr—SiO$_2$ RL formed on an IL of a bilayer of Ru. FIG. 4 illustrates the segregated nature of the RL, i.e., the magnetic grains segregated by the intergranular material, which is predominantly SiO$_2$. The IL was a first Ru layer (5 nm) sputter deposited at relatively low pressure (6 mTorr) followed by a second Ru layer (12 nm) sputter deposited at relatively high pressure (36 mTorr). The columnar growth of the upper Ru layer in the IL drives the segregation of the magnetic grains in the RL, as illustrated in FIG. 4. The columnar growth is believed due to the low surface mobility of the sputtered particles which is a result of the loss of kinetic energy due to the high number of collisions experienced in the high pressure sputtering environment. The high pressure sputter deposition of the IL can cause adjacent granular columns in the RL to have height variations comparable to the OC thickness, which can cause faults in the OC. The intergranular regions in the RL also exhibit a high density of voids and crystallographic faults which can provide pathways for humidity and corrosive gases to interact with the underlying SUL.

Reducing the sputtering pressure during deposition of the IL is known to improve the corrosion resistance of the disk. For example, for the disk with the dual-layer Ru IL as described above, a reduction of the sputtering pressure during deposition of the upper Ru layer from 46 mTorr to 36 mTorr improved the corrosion resistance of the disk. However, larger reductions in sputtering pressure lead to RLs with unacceptable values for coercivity and nucleation field. To achieve high performance perpendicular magnetic recording disks at ultra-high recording densities, e.g., greater than 200 Gbits/in$^2$, the RL should exhibit low intrinsic media noise (high signal-to-noise ratio or SNR), a coercivity $H_c$ greater than about 5000 Oe, and a nucleation field $H_n$ greater (more negative) than about −1500 Oe. The nucleation field $H_n$ has several meanings, but as used herein it is the reversing field, preferably in the second quadrant of the M-H hysteresis loop, at which the magnetization drops to 90% of its saturation value $M_s$. The more negative the nucleation field, the more stable the remanent magnetic state will be because a larger reversing field is required to alter the magnetization. Table 1 shows the values of $H_c$ and $H_n$ for disks with a CoPtCr—SiO$_2$ RL and a 16 nm thick IL of Ru$_{75}$Cr$_{25}$, where the subscripts refer to atomic percent (at. %), deposited at different sputtering pressures.

TABLE 1

| Sputtering Pressure (mTorr) | $H_c$ (Oe) | $H_n$ (Oe) |
|---|---|---|
| 46 | 6612 | −2093 |
| 9.7 | 3737 | −1316 |
| 4.0 | 2747 | −847 |

Table 1 shows that as the sputtering pressure for the IL is reduced, significant losses in $H_c$ and $H_n$ are observed. This is believed to be due to changes in interface morphology such as roughness at the IL-RL interface, which hinders the desired segregation of the RL grains and thus the development of high $H_c$ and $H_n$.

Figure 5:
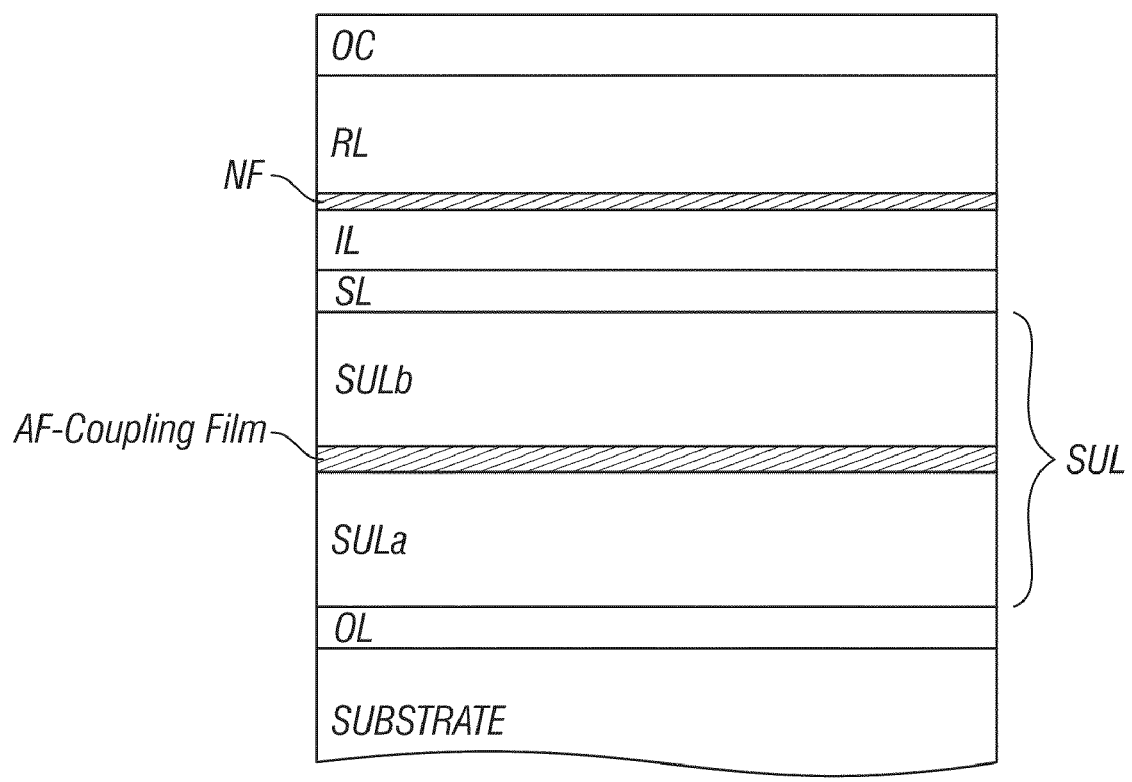
FIG. 5 is a schematic of a cross-section of a perpendicular magnetic recording disk according to this invention and illustrating a nucleation film (NF) between the IL and the RL.

The perpendicular magnetic recording disk according to the present invention is illustrated in FIG. 5. The structure is similar to the prior art structure of FIG. 3 but includes an ultrathin nucleation film (NF) between the IL and the RL. The disk has an RL with high $H_c$ and $H_n$ but is made with a method that does not require an IL deposited at high sputtering pressure. The IL is deposited at relatively low sputtering pressure (less than about 12 mTorr). As a result, there is no inducing of roughness in the RL and OC and thus no increase in corrosion susceptibility. The NF controls the segregation of the RL magnetic grains without negatively impacting the RL's epitaxial growth, which is needed to orient the c-axis of the RL out-of-plane. The NF is ultrathin, less than about 1.5 nm, and preferably less than about 1.0 nm. In this thickness regime, the thickness is an "average" thickness of a discontinuous film, so that the surface onto which the RL is deposited includes both the IL material and clusters or regions of the NF material. The NF is deposited at relatively high sputtering pressure (greater than about 30 mTorr) to encourage cluster formation on the IL. Also, when the RL is deposited at a relatively low deposition or growth rate on the NF the segregation of the magnetic grains in the RL is improved.

Table 2 shows the values of $H_c$ and $H_n$ for disks with a CoPtCr—$SiO_2$ RL and a 16 nm thick IL of $Ru_{75}Cr_{25}$ deposited at two different low sputtering pressures, but with a NF of $Ta_2O_5$ less than 0.3 nm thick formed on the IL before deposition of the RL.

TABLE 2

| Sputtering Pressure (mTorr) | $H_c$ (Oe) | $H_n$ (Oe) |
|---|---|---|
| 9.7 | 6578 | −2674 |
| 4.0 | 4149 | −2190 |

As shown by Table 2, the coercivity and nucleation fields are dramatically increased from the values in Table 1 in which the RL is grown on the high-pressure sputter-deposited $Ru_{75}Cr_{25}$ IL without a NF.

The data of Table 2 was for a NF formed of an oxide of Ta. However, the benefits of the NF are believed extendible to other oxides, such as oxides of Ti, Nb, Si, Mn and Hf.

The NF may also comprise Co or a Co alloy in addition to the oxide. In one example the NF was a 0.3 nm thick film of CoCrPt—$Ta_2O_5$ formed by co-sputtering from targets of Co, $Cr_{56}Pt_{44}$ and $Ta_2O_5$. Various compositions of this NF were tested, with Co content ranging from about 8 to 62 at. %. For Co content less than about 50 at. % in the NF the coercivity of the RL was above 6000 Oe. This amount of Co is significantly less than the at. % Co present in the RL, which is typically greater than about 50 at. %.

The NF may also comprise Ru in addition to the oxide. In one example the NF was a 0.5 to 1.5 nm thick film of Ru—$Ta_2O_5$ sputtered from single targets manufactured to contain Ru amounts ranging from 70% to 96%. Disks with various compositions of this NF were tested, with the best results being for NFs with $Ta_2O_5$ content ranging from about 4 to 15 at. % (Ru content between about 85 and 96 at. %). The NFs sputtered from single Ru—$Ta_2O_5$ targets led to comparable improvements in recording properties as those fabricated by co-sputtering Ru and $Ta_2O_5$.

Figure 6:
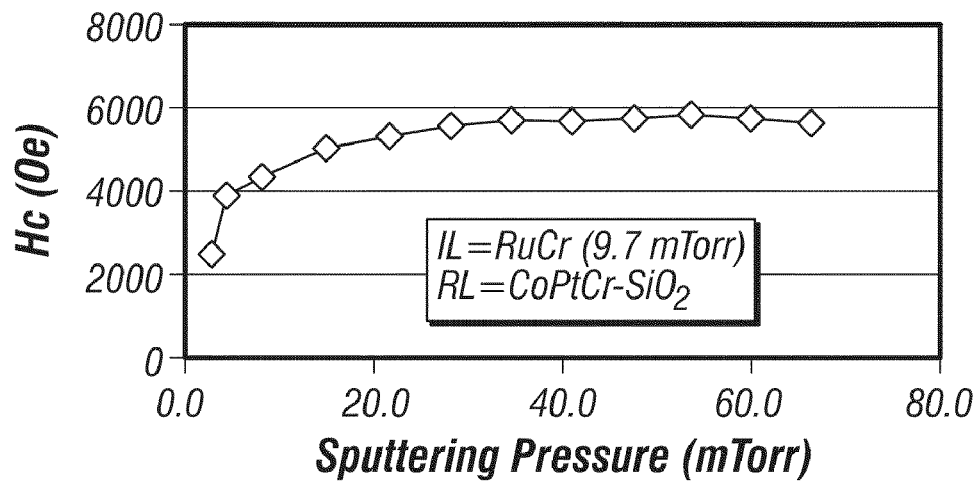
FIG. 6 is a graph of RL coercivity as a function of RL sputtering pressure for a disk according to this invention with a nucleation film between the IL and RL.
Figure 7:
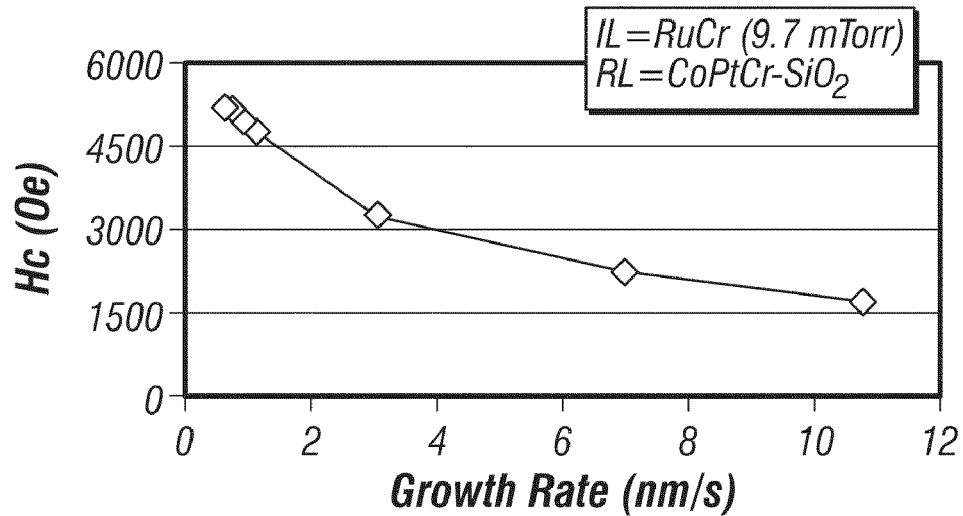
FIG. 7 is a graph of RL coercivity as a function of RL deposition or growth rate for a disk according to this invention with a nucleation film between the IL and RL.

For the NF with Co or a cobalt alloy, the recording properties are improved if the RL is deposited a sputtering pressure significantly higher than the sputtering pressure for the IL and at a relatively slow deposition or growth rate. The relationship between coercivity and sputtering pressure is shown in FIG. 6 for a $Co_{81}(Ta_2O_5)_{19}$ NF with a CoPtCr—$SiO_2$ RL and a $Ru_{75}Cr_{25}$ IL deposited at 9.7 mTorr. The optimal values of coercivity for the RL are achieved for sputtering pressures between about 30 and 60 mTorr. The relationship between RL coercivity and RL growth rates is shown in FIG. 7 for a $Co_{81}(Ta_2O_5)_{19}$ NF with a CoPtCr—$SiO_2$ RL and a $Ru_{75}Cr_{25}$ IL deposited at 9.7 mTorr.

The NF may also be formed of an alloy of two or more of elements including the elements Co, Cr, Ti, Zr, Mo, V and W. In one example, a NF formed of Co($Cr_{56}Pt_{44}$) provided similar results to NFs containing an oxide.

The disks of this invention also provided improvements in SNR over comparable disks made without nucleation films. SNR measurements performed at a linear density of about 750 kfci (thousand flux changes per inch) on disks with a single $Ru_{75}Cr_{25}$ IL grown at 46, 9.7, and 4 mTorr, respectively, showed SNR losses of 5.6 and 8 dB, respectively, when the sputtering pressure was dropped from 46 to 9.7 and 4 mTorr. This is consistent with an increase in recording noise by factors of 3.6 of 6.3 for sputter deposition at 9.7 and 4 mTorr, respectively. In contrast, the SNR for disks with a CoPtCr—$Ta_2O_5$ NF on a $Ru_{75}Cr_{25}$ IL grown at 9.7 and 4 mTorr showed SNR losses of only 1.0 and 2.7 dB, respectively. Similar improvements were measured in structures with NFs of $Ta_2O_5$ and $(Cr_{56}Pt_{44})(Ta_2O_5)$.

Measurements of both jitter and bit error rate (BER) also showed that the disks of this invention provided improvements over comparable disks made without nucleation films.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate;
   an underlayer of magnetically permeable material on the substrate;
   a nonmagnetic intermediate layer formed on the underlayer;
   a discontinuous nucleation film on and in contact with the intermediate layer, the nucleation film comprising Ru and an oxide of Ti and having a thickness less than 1.0 nm; and
   a perpendicular magnetic recording layer on and in contact with the nucleation film and comprising a granular ferromagnetic Co alloy.

2. The medium of claim 1 wherein the intermediate layer comprises a metal selected from Ru, Ti, Re, and Os.

3. The medium of claim 2 wherein the intermediate layer comprises an alloy containing at least one element selected from Ru, Ti, Re, and Os.

4. The medium of claim 3 wherein the intermediate layer comprises a RuCr alloy.

5. The medium of claim 1 wherein the underlayer of magnetically permeable material is formed of a material selected from the group consisting of alloys of CoFe, CoNiFe, NiFe, FeCoB, CoCuFe, FeAlSi, FeTaN, FeN, FeTaC, CoTaZr and CoZrNb.

6. The medium of claim 1 wherein the underlayer of magnetically permeable material is a lamination of multiple magnetically permeable films separated by nonmagnetic films.

7. The medium of claim 6 wherein the nonmagnetic films in the lamination provide antiferromagnetic coupling of the magnetically permeable films in the lamination.

8. The medium of claim 1 wherein the recording layer further comprises one or more oxides of one or more of Si, Ta, Ti and Nb.

9. A perpendicular magnetic recording disk comprising:
a substrate;
an underlayer of magnetically permeable material on the substrate;
a nonmagnetic intermediate layer on the underlayer and comprising a material selected from Ru and a Ru alloy;
a discontinuous nucleation film comprising Ru and $Ta_2O_5$ on and in contact with the intermediate layer, the nucleation film having a thickness less than about 1.5 nm; and
a perpendicular magnetic recording layer on and in contact with the nucleation film and comprising a granular ferromagnetic Co alloy and one or more oxides of one or more of Si, Ta, Ti and Nb.

10. The disk of claim 9 wherein the atomic percent of Ru in the nucleation film is between about 85 and 96.

11. A perpendicular magnetic recording system comprising:
the disk of claim 9;
a write head for magnetizing regions in the recording layer of said disk; and
a read head for detecting the transitions between said magnetized regions.

* * * * *